United States Patent [19]
Engel et al.

[11] Patent Number: 5,724,733
[45] Date of Patent: Mar. 10, 1998

[54] METHOD OF PRODUCING A PISTON ASSEMBLY

[75] Inventors: William K. Engel, Peoria; Michael H. Hinrichsen, Goodfield; Howard Savage, Joliet; Donald H. Sherman, Morton; Kenneth R. Watts, Washington, all of Ill.

[73] Assignee: Caterpillar Inc., Peoria, Ill.

[21] Appl. No.: 694,345

[22] Filed: Aug. 8, 1996

[51] Int. Cl.⁶ .................................... B23P 11/00
[52] U.S. Cl. .................... 29/888.02; 29/888.044; 92/187
[58] Field of Search .......... 29/888.04, 888.042, 29/888.044, 888.02; 92/187

[56] References Cited

U.S. PATENT DOCUMENTS

| | | | |
|---|---|---|---|
| 3,120,816 | 2/1964 | Firth et al. | 103/162 |
| 3,589,756 | 6/1971 | Pruvot | 92/187 |
| 3,787,128 | 1/1974 | Maistrelli | 403/135 |
| 4,290,181 | 9/1981 | Jackson | 29/458 |
| 5,469,776 | 11/1995 | Martensen et al. | 92/187 |
| 5,490,446 | 2/1996 | Engel | 92/157 |

FOREIGN PATENT DOCUMENTS

| | | | |
|---|---|---|---|
| 57-129962 | 8/1982 | Japan . | |
| 58-50360 | 3/1983 | Japan | 29/888.042 |
| 3-64672 | 3/1991 | Japan | 29/888.042 |
| 08082278 | 3/1996 | Japan . | |
| 08082279 | 3/1996 | Japan . | |
| 1 268 203 | 3/1972 | United Kingdom . | |

*Primary Examiner*—Erick R. Solis
*Attorney, Agent, or Firm*—J. W. Burrows

[57] ABSTRACT

A method is provided for producing a piston assembly adapted for use in a hydraulic pump or motor and having an overall length shorter than previously known piston assemblies while maintaining a strong mechanical connection and a high, efficient volumetric output. The method includes the steps of forming a slipper with a spherical ball on one end; forming a piston having a body portion and a connecting portion, the connecting portion having a spherical bottom surface, a groove spaced from the bottom surface and a contoured portion having an angled outer surface and an inner surface; inserting the spherical ball into the cavity; forcing the contoured portion inwardly to place the inner surface into contact with the spherical ball and to substantially longitudinally align the outer surface of the piston body with the angled surface of the contoured portion; heat treating the piston to a predetermined hardness and depth; and finishing the total longitudinal length of the piston to a finished size.

5 Claims, 6 Drawing Sheets

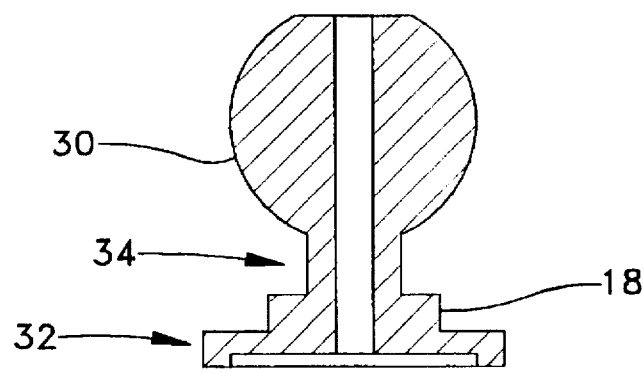
Fig_2_
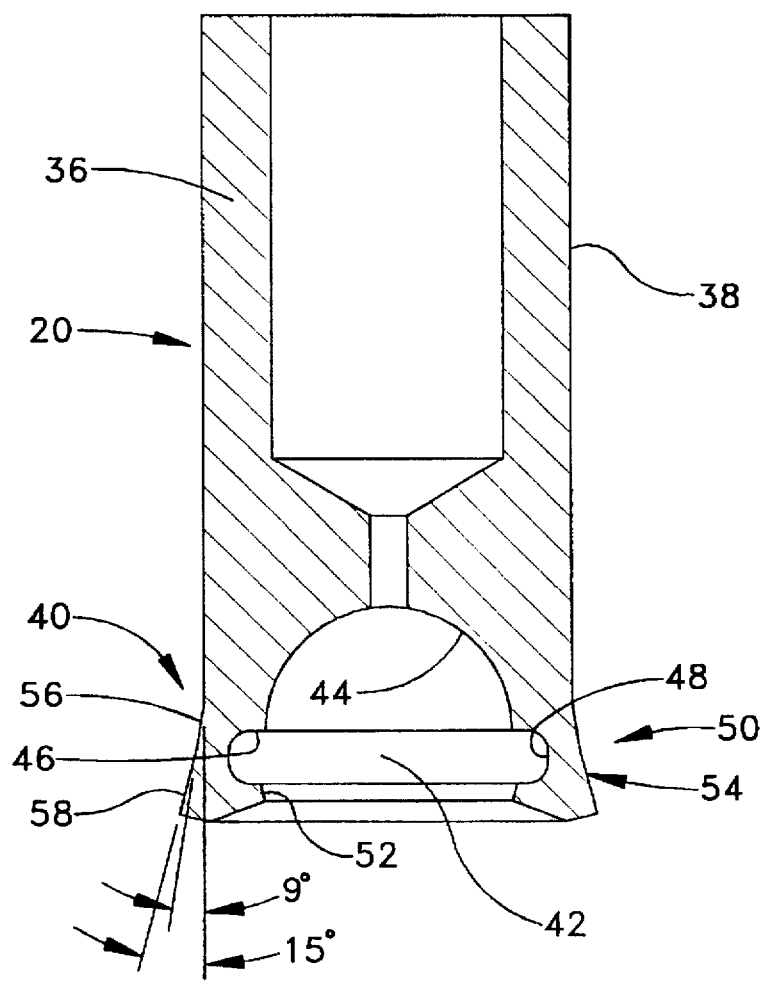
Fig_3_

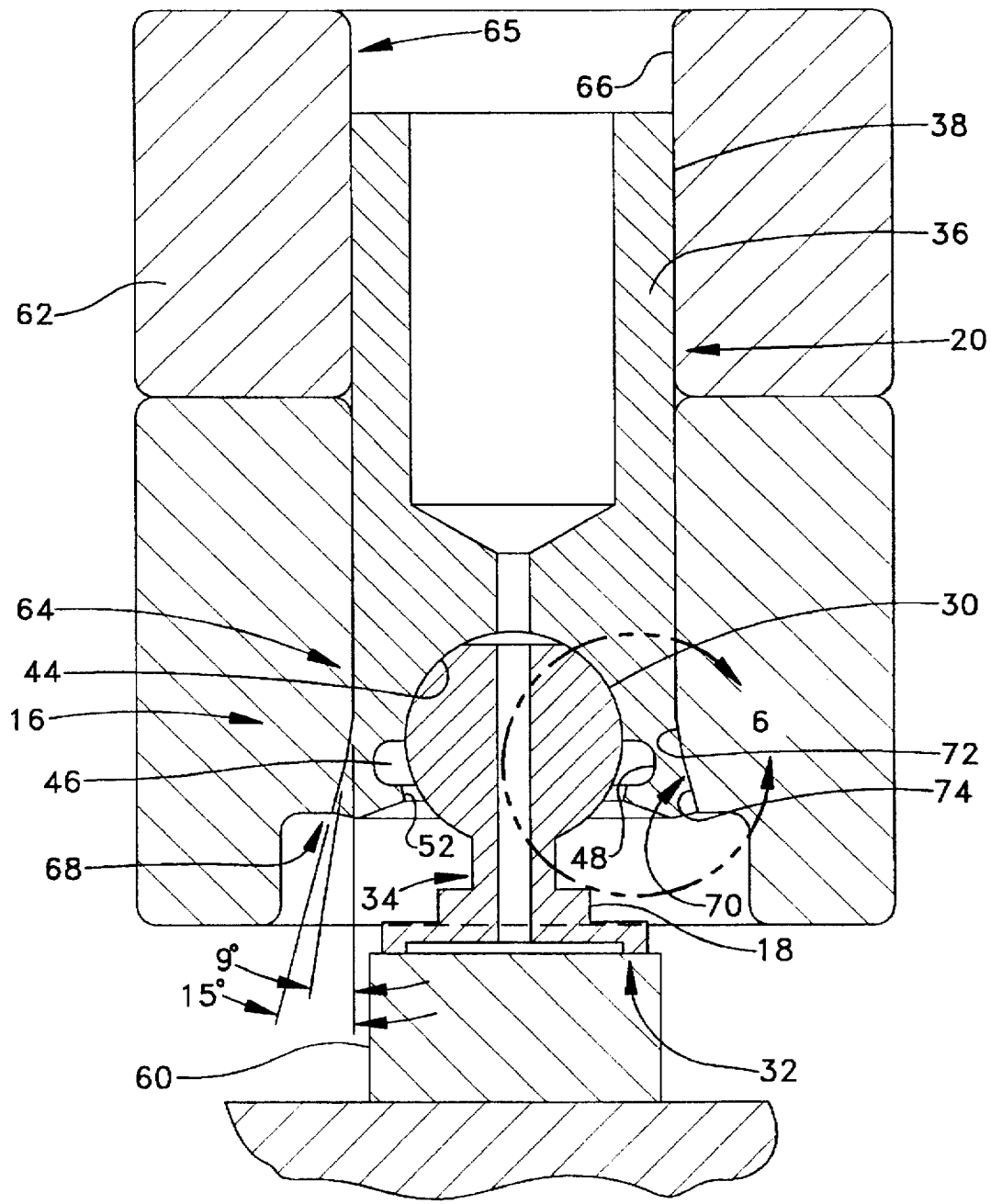
Fig_4

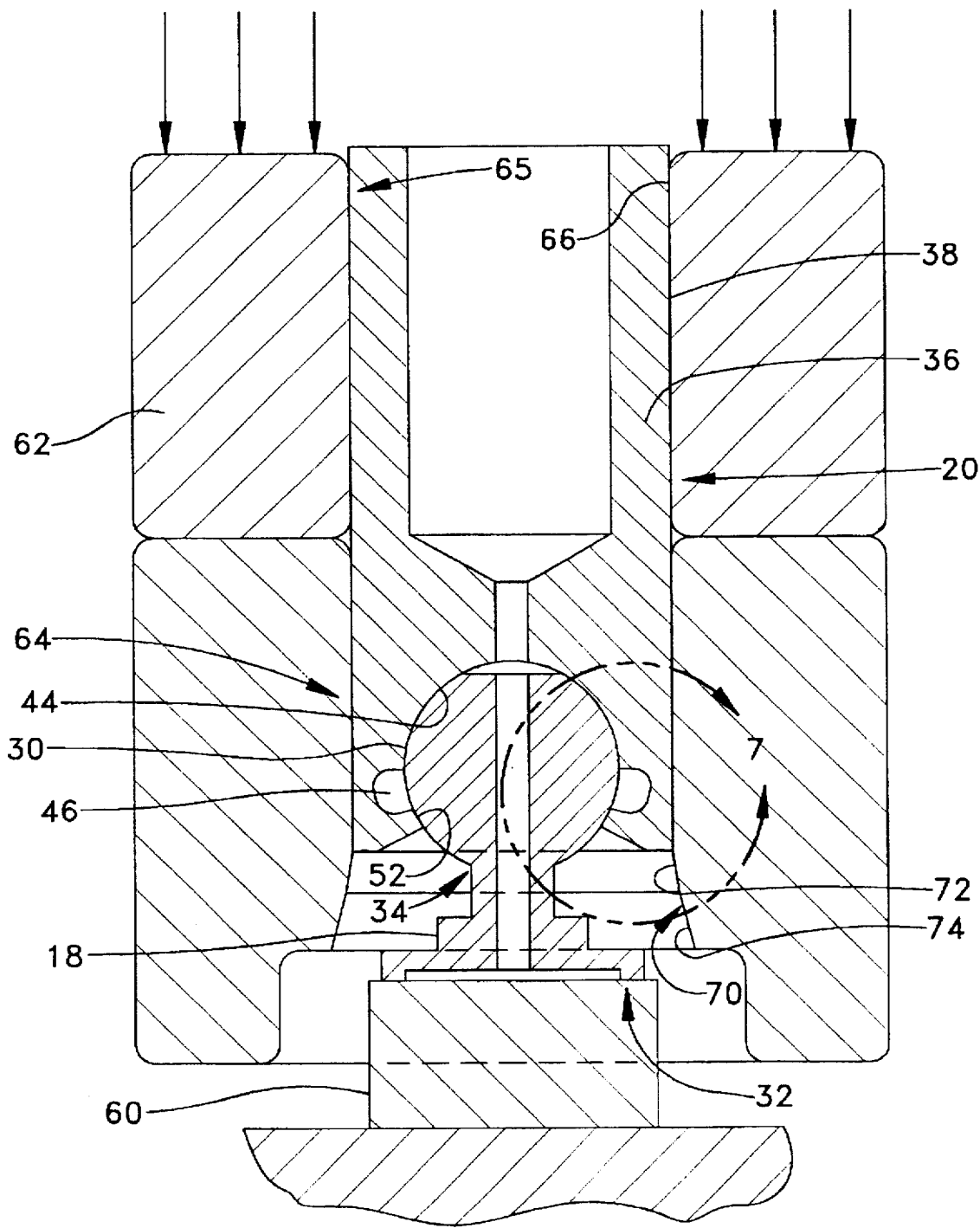
Fig_5_

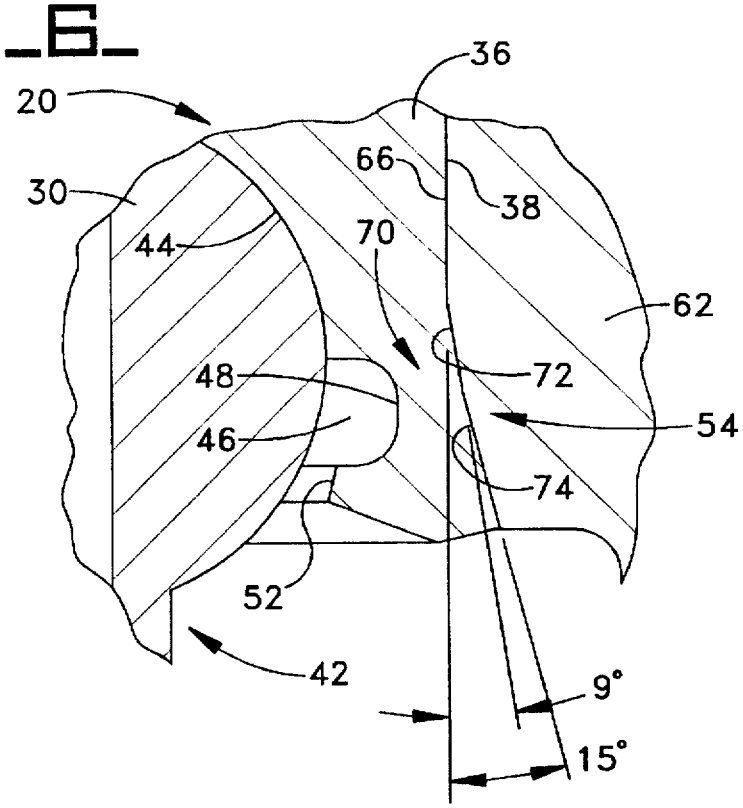
Fig_6_
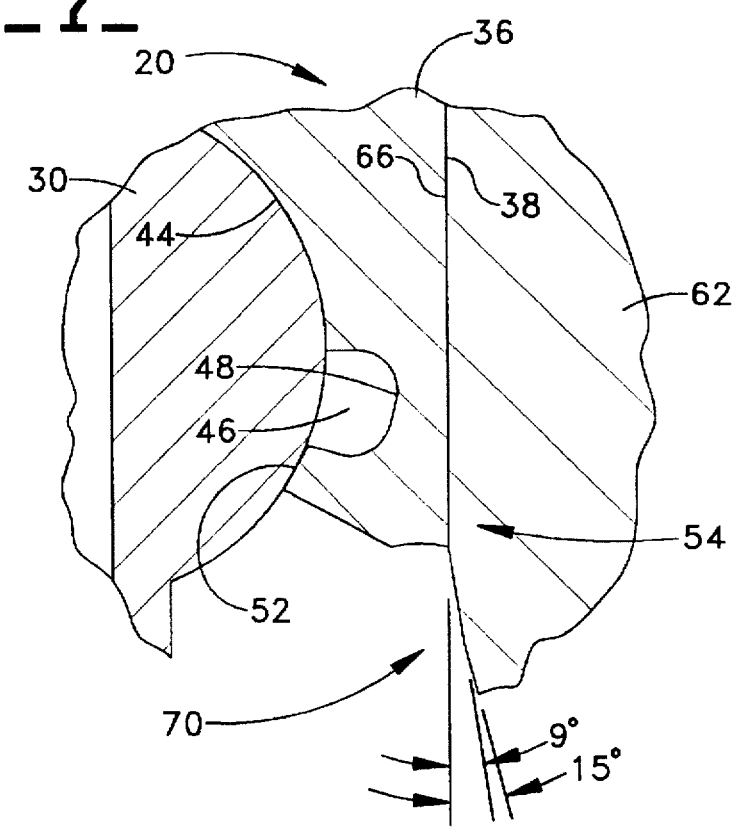
Fig_7_

Fig_8_
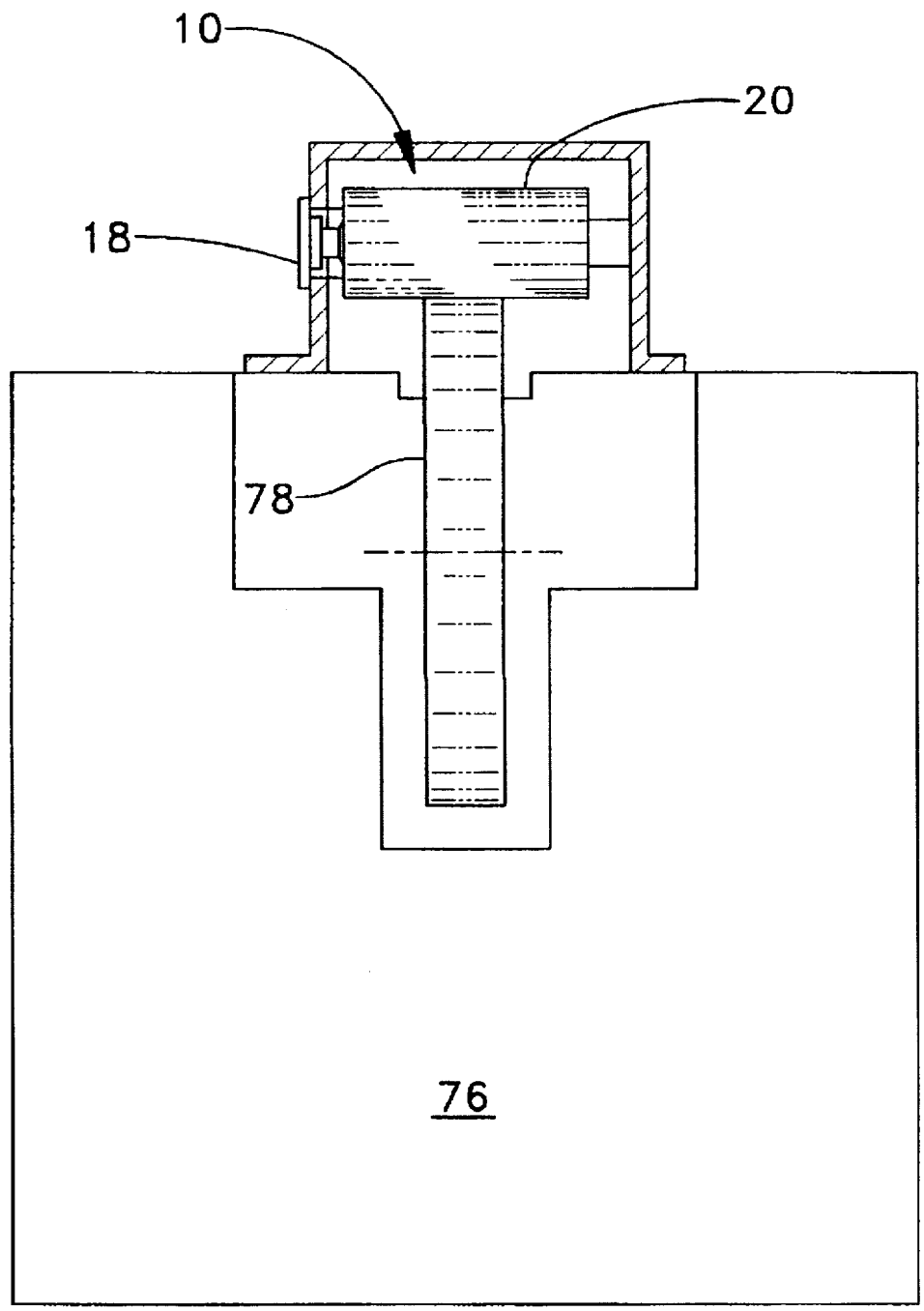

METHOD OF PRODUCING A PISTON ASSEMBLY

TECHNICAL FIELD

This invention relates generally to a piston assembly for use in a fluid translating device such as a hydraulic pump or motor and more particularly to the connection of the elements of the piston assembly.

BACKGROUND ART

Piston assemblies normally used in hydraulic pumps or motors are made of steel and hardened to increase their useful wear life. In the known piston assemblies, a slipper is pivotally connected to a piston so that one part can pivot relative to the other. In these piston assemblies, a spherical cavity is defined in one of the elements and a spherical ball is disposed on the other element. Upon assembly, the spherical ball is placed in the spherical cavity and mechanically retained therein. In most of the known mechanical connections, a portion of the member having the spherical cavity is forced to wrap around a portion of the spherical ball that is not in contact with the spherical cavity. This mechanical connection is effective to allow the slipper to rotate relative to the piston during use. However, these known mechanical connections result in reducing the effective contact length of the piston within the bore of the rotor that it slides within relative to the slipper. Consequently, in order to have a piston that has a sliding length long enough to reduce leakage and to provide an effective volumetric output, it is necessary to increase the overall length of the fluid translating device. In order to increase the effective contact length of the piston and shorten the overall length of the piston assembly, it has been known to use a snap ring to retain a spherical head of the slipper within a cavity at one end of the piston. Even though this known arrangement increases the effective contact length of the piston, it many times allows a degree of longitudinal movement between the slipper and the piston. Furthermore, since the snap ring must be split in order to allow its assembly, its effective retention is limited since there is not 100% contact all around the spherical ball. Additionally, since space must be provided for the snap ring, the relative sizes of the spherical ball and/or the cavity results in a reduction in the overall strength of the mechanical connection.

The present invention is directed to overcoming one or more of the problems as set forth above.

DISCLOSURE OF THE INVENTION

In one aspect of the present invention a method of producing a piston assembly is provided. The piston assembly has a piston mechanically connected to a slipper and is adapted for use in a fluid translating device such as a hydraulic pump or motor having a barrel with a bore defined therein to slidably receive the piston. The steps include forming the slipper with a spherical ball disposed at one end; forming the piston having a body portion with an outer surface having a cylindrical length and a connecting portion disposed at one end, the connection portion having a cavity defined therein with a spherical bottom surface spaced from the one end, a groove defined in the end portion within the cavity between the spherical bottom surface and the one end, and a contoured portion having an inner surface and an outer surface projecting outwardly beyond the outer surface of the piston body between the bottom of the cavity and the one end; inserting the spherical ball of the slipper into the cavity of the piston to contact the spherical bottom surface; forcing the contoured portion of the connecting portion inwardly to move the inner surface thereof into sliding contact with a portion of the spherical ball to secure the spherical ball within the cavity and to substantially longitudinally align the outer surface thereof with the outer surface of the piston body; hardening the outer surface of the piston along its entire length to a predetermined depth and hardness; and finishing the outer surface of the piston along its entire length to a predetermined size.

The present invention provides a method that produces a piston assembly that is shorter in overall length since the cylindrical surface of the piston extends beyond the point of connection with the spherical ball. The effective sliding contact of the outer surface of the piston being in close proximity with the other end of the slipper permits the overall length of the pump or motor to be shorter while still maintaining high volumetric output with minimal leakage between the outer surface of the piston and the bore of the barrel and maintaining a strong mechanical connection.

BRIEF DESCRIPTION OF THE DRAWINGS

FIG. 2 is a diagrammatic representation of one element of the piston assembly of FIG. 1;

FIG. 3 is a diagrammatic representation of another element of the piston assembly of FIG. 1 prior to assembly;

FIG. 4 is a diagrammatic representation of the elements of the piston assembly being connected;

FIG. 5 is a diagrammatic representation of the piston assembly subsequent to being connected;

FIG. 6 is an enlargement of a portion of the piston assembly of FIG. 4;

FIG. 7 is an enlargement of a portion of the piston assembly of FIG. 5; and

FIG. 8 is a diagrammatic representation of a machine operative to finish the outer surface of the piston assembly.

BEST MODE FOR CARRYING OUT THE INVENTION

Figure 1:
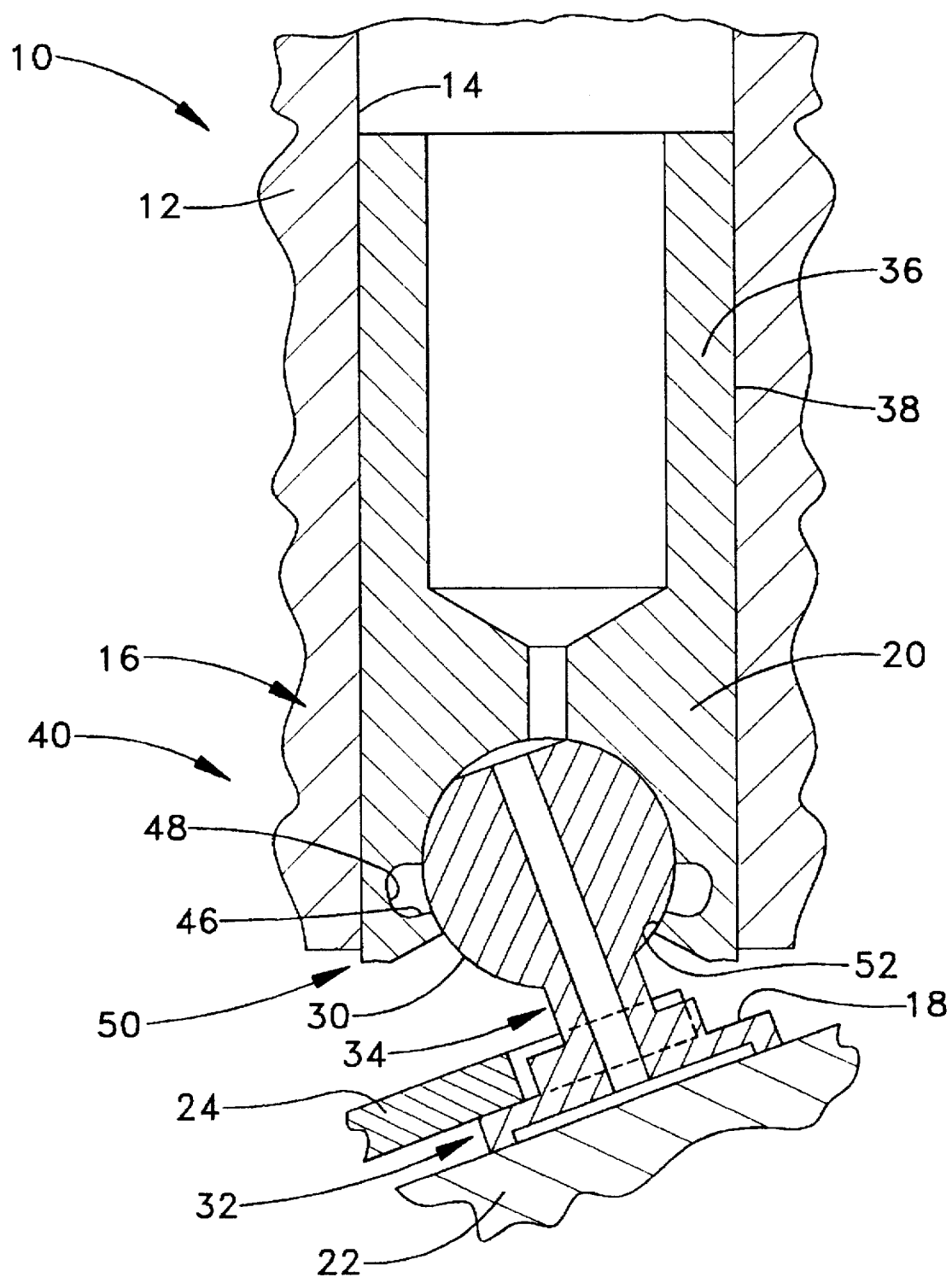
FIG. 1 is a diagrammatic representation of a piston assembly produced by an embodiment of the subject invention.

Referring to the drawings and more particularly to FIGS. 1-3, a portion of a hydraulic pump or motor 10 is illustrated and includes a portion of a barrel 12 having a bore 14 defined therethrough, a piston assembly 16 having a slipper 18 and a piston 20, a portion of a swashplate 22 and a portion of a slipper retainer 24. Even though only one bore 14 and one piston assembly 16 is illustrated, it is recognized that in known pumps or motors more than one bore and piston assembly 16 is required. For example, most piston type pumps or motors normally have either five, seven, or nine bores 14 in the barrel 12 with respective piston assemblies 16 slidably associated therewith.

The slipper 18 has a spherical ball 30 disposed at one end thereof and a sliding portion 32 at the other end thereof connected by a neck portion 34. The neck portion 34 is smaller in cross section than the largest cross section of the spherical ball 30. The sliding end portion 32 is adapted to be in sliding contact with the swashplate 22 and is maintained in contact therewith, in part, by the slipper retainer 24.

FIG. 3 shows the piston 20 in its formed shape prior to being mechanically connected to the slipper 18. The piston 20 includes a body portion 36 having a cylindrical outer surface 38 that extends along a longitudinal length thereof and a connecting portion 40 disposed at one end. The connecting portion 40 includes a cavity 42 having a substantially spherical bottom surface 44 and is defined in the piston 20 extending inwardly from the one end, a groove 46 having a bottom surface 48 and is defined in the connecting portion 40 located within the cavity 42 between the bottom spherical surface 44 and the one end, and a contoured portion 50 disposed generally adjacent the one end. It is recognized that the bottom surface 44 could be a true spherical surface without departing from the essence of the subject invention.

The contoured portion 50 includes an inner surface 52 and an angled outer surface 54. The inner surface 52 is located on the contoured portion 50 within the cavity 42 between the groove 46 and the one end. The inner surface 52 is a conical surface and has a diameter greater than the diameter of the spherical ball 30. The angled outer surface 54 is a conical surface located on the outermost side of the contoured portion 50 and projects outwardly at an angle relative to the cylindrical outer surface 38 of the piston body 36. In the subject arrangement the outer surface 54 of the contoured portion 50 has a first surface 56 that is angled at approximately nine degrees with respect to the outer surface 38 and a second surface 58 that is angled at approximately fifteen degrees with respect to the outer surface 38. The first surface 56 has a vertex on the outer surface 38 at a location generally between the bottom of the cavity 42 and the start of the groove 46. The second surface 58 has a vertex on the first angled surface 56 at a location generally even with the midpoint of the groove 46.

Referring to FIGS. 4–6, the piston assembly 16 is illustrated during the various steps of producing the assembly. As illustrated in FIG. 4, the sliding end portion of 32 the slipper 18 is positioned on a support block mechanism 60 and the piston 20 is positioned so that the spherical ball 30 of the slipper 18 is in contact with the spherical bottom surface 44 within the cavity 42. A die mechanism 62 is provided to mechanically connect the piston 20 to the slipper 18. The die mechanism 62 includes a formed chamber 64 having a bore 65 with an inner surface 66 and a formed portion 68. The inner surface 66 is a cylindrical surface having a diameter of a size sufficient to slidably receive the piston 20 therein.

The formed portion 68 angles outwardly relative to the inner surface 66 and includes an angled surface 70 having first and second surfaces 72,74. The first surface 72 has a vertex on the inner surface 66 and forms an angle therewith of approximately nine degrees. The second surface 74 has a vertex on the first surface 72 and forms an angle with the inner surface 66 of approximately fifteen degrees. When the piston 20 is received in the bore 65 of the formed chamber 64, the formed portion 68 of the die mechanism 62 intimately contacts the angled outer surface 54 of the contoured portion 50 of the piston 20.

Prior to placing the cavity 42 of the piston 20 over the spherical ball 30, a lubricant is deposited onto the contacting members to reduce the tendency of the elements seizing or scuffing during use. Likewise, a lubricant is deposited within the formed chamber 64 of the die mechanism 62 and the angled outer surface 54 of the contoured portion 50 to reduce the tendency of the surfaces scuffing or seizing during the forming operation.

FIGS. 6–7 better illustrate the details of the formed portion 68 of the die mechanism 62 and the contoured portion 50 of the piston 20. FIG. 6 illustrates the details prior to the mechanical connection being made and FIG. 7 illustrates the details following the mechanical connection being made.

FIG. 8 illustrates a machine, such as a centerless grinder 76 having a grinding wheel 78 that is used subsequent to heat treating of the piston assembly 16 to finish the entire outer surface 38 of the piston 20.

It is recognized that various forms of the subject arrangement could be utilized without departing from the essence of the invention. For example, the respective angled outer surface 54 of the piston and the formed portion 68 of the die mechanism 62 could be a straight line or a continuous curve as opposed to having the two different surfaces at different angles. Likewise, the overall die mechanism 62 could be of various shapes or designs other than that illustrated. The force needed to move the die mechanism 62 relative to the support block mechanism 60 could be applied by any known manner, such as a mechanical press, hydraulic apparatus or any other force transferring mechanism.

INDUSTRIAL APPLICABILITY

In the forming of the slipper 18, the material is heat treated to condition the microstructure thereof for subsequent surface hardening, rough finished to size, and polished or ground to final size. The piston 20 is formed by machining the piston body 36 to a rough finished size and machining the angled outer surface 54 of the contoured portion 50 to its predetermined angle and size. The cavity 42 within the connecting end portion 40 is machined to its desired shape with the spherical bottom surface 44 formed, the groove 46 formed and properly located relative to the bottom of the cavity 42. The inner surface 52 of the contoured portion 50 is machined to a size to permit the spherical ball 30 to pass therethrough. The spherical bottom surface 44 is polished or ground to its finished size to substantially match the size of the spherical ball 30.

Prior to performing the step of mechanically connecting the slipper 18 and the piston 20, as stated above, it is beneficial to apply a lubricant to the appropriate mating surfaces to inhibit seizing or scuffing of the elements and to lower the force required to cause the material in the piston 20 to change shape and/or position. During the mechanical connecting step, the slipper 18 is located on the support block 60 with the cavity 42 of the piston 20 placed into position over the spherical ball 30 so that the spherical ball 30 is in contact with the spherical bottom surface 44 of the piston 20. The die mechanism 62 is moved into position to receive the piston 20 into the formed chamber 64 so that the contoured portion 50 of the piston 20 mates with the formed portion 68 of the die mechanism 62. A force is applied to the die mechanism 62 moving it towards the support block mechanism 60. During the movement of the die mechanism 62, the formed portion 68 forces the contoured portion 50 substantially radially inwardly. As the contoured portion 50 is being forced inward, the material between the bottom surface 48 of the groove 46 and the angled outer surface 54 flows to allow bending of the contoured portion 50 with respect to the piston body 36. As the die mechanism 62 continues its movement towards the support block mechanism 60, the inner surface 52 of the contoured portion 50 moves closer to the spherical ball 30 of the slipper 18. Due to the controlled size of the contoured portion 50, once the die mechanism 62 has been moved to its extreme position as illustrated in FIGS. 5 and 7, the inner surface 52 of the contoured portion 50 is in close, intimate proximity with the spherical ball 30 and the angled outer surface 54 of the contoured portion 50 is in substantial longitudinal alignment with the outer surface 38 of the piston body 36. Once the inner surface 52 is in close, intimate proximity with the spherical ball 30, the spherical ball 30 is secured in the cavity 42 and is able to swivel or rotate relative to the piston 20.

Following the mechanical connecting step, the entire outer surface of the piston 20 that includes the outer surface 38 of the piston body 36 and the angled outer surface 54 of the contoured portion 50 is heat treated to a predetermined hardness and depth.

Subsequent to the heat treating of the entire outer surface of the piston 20, the entire surface thereof is ground to a finished size by the grinding machine 76.

Since the angled outer surface 54 extends beyond the center point of the spherical ball 30 and the finished size of the angled outer surface is the same as the finished size of the outer surface 38 of the piston body 36, the overall length of the piston assembly 16 is shorter than those piston assemblies previously made by swaging the piston to the slipper. The only limitation to how close the one end of the piston 20 can be to the other end of the slipper 18 is to what degree the slipper 18 needs to pivot with respect the piston 20 during use.

Thus the method for producing a piston assembly 16 for use in a hydraulic pump or motor 10 includes the steps of forming a slipper 18 with a spherical ball 30 on one end; forming a piston 20 having a cavity 42 with a spherical bottom surface 44, a groove 46 spaced at a predetermined distance from the bottom surface 44, and a contoured portion 50 on the end having an angled outer surface 54 projecting outwardly with respect to the outer surface 38 of the piston 20, and an inner surface 52 adjacent the end of the piston 20; inserting the spherical ball 30 into the cavity 42 to contact the bottom surface 44; forcing the inner surface 52 of the contoured portion 50 of the piston 20 inwardly into contact with the spherical ball 30 and substantially longitudinally aligning the angled outer surface 54 with the outer surface 38 of the piston body 36; hardening the entire outer surface of the piston 20 to a predetermined hardness and depth; and finishing the outer surface along its entire length to a predetermined size. The step of forming also includes locating the start of the groove 46 at a distance from the bottom of the cavity 42 generally equal to one half the diameter of the spherical ball 30 and controlling the distance from the bottom 48 of the groove 46 to the angled outer surface 54 of the contoured portion 50.

In view of the foregoing, it is readily apparent that the subject method provides a process to produce a piston assembly 16that has a shorter overall length as compared to previous piston assemblies while still maintaining a strong mechanical connection between the piston 20 and the slipper 18 and maintaining high, efficient volumetric output.

Other aspects, objects and advantages of the invention can be obtained from a study of the drawings, the disclosure and the appended claims.

We claim:

1. A method for producing a piston assembly having a piston mechanically connected to a slipper and adapted for use in a hydraulic pump or motor having a barrel with a bore defined therein to slidably receive the piston, the method comprising the steps of:

forming the slipper with a spherical ball disposed at one end thereof;

forming the piston with a body portion having a cylindrical outer surface extending longitudinally therealong and a connecting portion disposed at one end thereof, the connecting portion having a cavity defined therein with a substantially spherical bottom surface spaced from the one end thereof, a groove defined in the end portion within the cavity between the spherical bottom surface and the one end, and a contoured portion having an inner surface and an angled outer surface projecting outwardly beyond the outer surface of the piston body between the bottom of the cavity and the one end thereof;

inserting the spherical ball of the slipper into the cavity of the connecting portion to contact the spherical bottom surface;

forcing the contoured portion of the connecting portion inwardly to move the inner surface thereof into sliding contact with a portion of the spherical ball to secure the spherical ball within the cavity and to substantially longitudinally align the outer surface thereof with the outer surface of the piston body;

hardening the outer surface of the piston along its entire length to a predetermined depth and hardness; and finishing the outer surface of the piston along its entire length to a predetermined size.

2. The method of claim 1 wherein the step of forcing the contoured portion inwardly includes the steps of placing the piston into a formed chamber of a die mechanism having an inner surface of a size sufficient to slidably receive the piston and a formed portion of a size to mate with the outer surface of the contoured portion of the piston and forcing the die to move axially along the longitudinal length of the piston to substantially radially move the inner surface of the contoured portion into sliding contact with the spherical ball of the slipper and to substantially axially align the outer surface of the contoured portion with the outer surface of the piston body.

3. The method of claim 2 wherein the step of forming the piston includes the steps of controlling the location of the beginning of the groove relative to the bottom of the cavity to a distance substantially equal to one half the diameter of the spherical ball and controlling the distance between a bottom of the groove and the outer surface of the angled outer surface to a predetermined distance in order to ensure that during the step of forcing the contoured portion inwardly the inner surface of the contoured portion substantially moves radially inwardly.

4. The method of claim 3 including the step of lubricating the interface between the die and the outer surfaces of the piston and the contoured portion to reduce seizing or scuffing during the step of forcing the contoured portion inwardly.

5. The method of claim 4 wherein the step of finishing the outer surfaces includes the step of grinding the outer surface of the piston along its entire length.

* * * * *